United States Patent
Gruber et al.

(10) Patent No.: US 8,104,174 B2
(45) Date of Patent: Jan. 31, 2012

(54) METHOD FOR PRODUCING A PISTON

(75) Inventors: Rainer Gruber, Wachtberg (DE);
Antonio Casellas, Siegburg (DE);
Stefan Schneid, Remagen (DE)

(73) Assignee: GKN Sinter Metals Holding GmbH, Radevormwald (DE)

(*) Notice: Subject to any disclaimer, the term of this patent is extended or adjusted under 35 U.S.C. 154(b) by 0 days.

(21) Appl. No.: 12/695,799

(22) Filed: Jan. 28, 2010

(65) Prior Publication Data

US 2010/0193309 A1 Aug. 5, 2010

Related U.S. Application Data

(63) Continuation of application No. PCT/EP2008/003127, filed on Apr. 18, 2008.

(30) Foreign Application Priority Data

Jul. 30, 2007 (DE) .................. 10 2007 036 017

(51) Int. Cl.
*B21K 1/18* (2006.01)
*B21D 39/00* (2006.01)

(52) U.S. Cl. .......... 29/888.044; 29/888.3; 29/432; 29/457; 29/506; 277/435; 277/436

(58) Field of Classification Search .......... 29/888.042–888.048, 888.3, 432, 29/456, 457, 505, 506, 508–513; 277/435–439; 92/248, 212, 172
See application file for complete search history.

(56) References Cited

U.S. PATENT DOCUMENTS

| 3,212,411 A | * | 10/1965 | Storms | 92/248 |
| 4,489,474 A | * | 12/1984 | Brown et al. | 29/508 |
| 6,305,266 B1 | * | 10/2001 | Jensen et al. | 92/248 |

FOREIGN PATENT DOCUMENTS

| DE | 103 57 561 B3 | 7/2005 |
| EP | 0 345 561 A2 | 5/1989 |
| EP | 0 658 611 A | 6/1995 |
| EP | 1 121 544 B1 | 10/1999 |
| JP | 61 082072 A | 4/1986 |
| JP | 63 172061 A | 7/1988 |
| JP | 02-06633 | 3/1990 |
| JP | 10 089479 A | 4/1998 |
| JP | 2004-316704 | 11/2004 |
| JP | 2004-347082 | 12/2004 |
| JP | 2006-046617 | 2/2006 |
| WO | 00/34682 A | 6/2000 |

OTHER PUBLICATIONS

International Search Report corresponding corresponding to PCT/EP2008/003127 under date of issue of Jul. 15, 2008.
PCT International Preliminary Report on Patentability, PCT/EP2008/003127, May 20, 2010.

* cited by examiner

*Primary Examiner* — Sarang Afzali
(74) *Attorney, Agent, or Firm* — Quarles & Brady LLP (57) ABSTRACT

The invention relates to a piston for a piston-cylinder arrangement, particularly a shock absorber piston, which includes a piston body, that has a circumferential surface. A sealing collar has an outer circumferential surface, an inner circumferential surface, a first peripheral surface, and a first sealing lip, and extends around the circumferential surface of the piston body and covers at least part of the circumferential surface in the axial direction. The first peripheral surface connects the two circumferential surfaces to each other at a first end of the sealing collar. The first sealing lip is delimited by the first peripheral surface and the outer circumferential surface, and the first sealing lip is configured evenly in the circumferential direction.

19 Claims, 6 Drawing Sheets

METHOD FOR PRODUCING A PISTON

CROSS-REFERENCE TO RELATED APPLICATIONS

This is a continuation of International Patent Application No. PCT/EP2008/003127 filed Apr. 18, 2008, which claims priority of German Patent Application No. 10 2007 036 017.9-12 filed Jul. 30, 2007, the disclosures of which are hereby incorporated by reference in their entirety for all purposes.

STATEMENT CONCERNING FEDERALLY SPONSORED RESEARCH OR DEVELOPMENT

Not applicable.

FIELD OF INVENTION

The invention relates to a piston for a piston-cylinder arrangement, particularly a shock absorber piston, as well as a method for producing a piston, particularly such piston.

BACKGROUND

EP 1 121 544 B1 describes a piston for a piston-cylinder arrangement, particularly a shock absorber piston, which has a piston body with a circumferential surface and a sealing collar. The sealing collar has an outer circumferential surface, an inner circumferential surface, a first peripheral surface and a first sealing lip and extends around the circumferential surface of the piston body and covers at least part of the circumferential surface in the axial direction. The first peripheral surface connects the two circumferential surfaces to each other at a first end of the sealing collar. The sealing lip is delimited by the first peripheral surface and the outer circumferential surface and projects out radially from the outer circumferential surface.

EP 1 121 544 B1 moreover describes a method for producing such piston where a sealing blank and a piston body are provided, the sealing blank is then pushed over the piston body, and the sealing blank is pressed against the piston body. With this known piston, the sealing collar consists of a thermoplastic material, preferably of PTFE (polytetrafluoroethylene), and according to this known method is molded by thermoforming onto the circumferential surface of the piston body from a circular washer which represents the sealing blank. For this purpose, the circular washer, or the sealing blank, is fitted onto one end of the piston body and the piston body that is prepared in this way is pressed into a heated forming and calibration cylinder, wherein the circular washer is placed as a band around the circumferential surface of the piston body and is subsequently pressed against the circumferential surface of the piston body under the influence of heat. In this instance, the piston body is provided with at least one peripheral web which is to ensure a perfect and reliable connection between the sealing collar and the piston body. The piston with its pressed-on sealing collar is then finally guided through a cooling tube. The "back memory" phenomenon of the plastic material of the sealing collar has the effect that after the forming, the one edge of the sealing collar, which is formed by the inside edge of the circular washer contracts inward, and the other, opposite edge of the sealing collar, which is formed by the outer edge of the circular washer, repositions itself to the outside and on this occasion projects beyond the remaining circumferential surface of the sealing collar, similar to a sealing lip.

The sealing lip of this known piston is therefore generated in this known process in that the sealing collar remembers its original form of the circular washer. This known piston and this known method have the disadvantage that the sealing lip is highly corrugated, because of the internal stresses that are formed as a result of manufacturing during the forming of the circular washer into the sealing collar, which can impair the sealing function.

DE 195 13 727 B4 also describes a piston as well as a method for producing such piston. This known piston also has a support element and a guide ring that at least partially encloses the support element on its outside, where said guide ring is of polymeric material, preferably of PTFE. The support element has at least one circumferential radial groove that is open in the direction of the guide ring, where said groove engages radially into the assembly-related projection of the guide ring. The guide ring on each of its two sides has an assembly-related, one-piece molded sealing lip which extends in a radial direction. The sealing lips protrude the contact surface element of the support in an axial direction. In this known method, the blank of the guide ring is pushed over the outside of the support element and is subsequently molded exclusively radially evenly full-circumferentially until the condition of the guide ring material is no longer flowable. Because the material of the guide ring starts to flow in this context, the grooves of the support element are filled completely by the material of the guide ring. While the material of the guide ring gradually flows into the grooves of the carrier element and fills them, portions of this material flow as a result of the radial molding in an axial direction along the circumferential surface of the carrier element and form the sealing lips. The sealing lips are thus formed as a result of the guide ring material which is diverted in a radial direction during the radial molding.

This known piston and this known method have the disadvantage that due to the manufacturing, the sealing lips have a relatively poor fabrication precision, since the material of the guide ring can freely flow in the axial direction during the radial compression.

SUMMARY OF THE INVENTION

The present invention provides a piston for a piston-cylinder arrangement, particularly a shock absorber piston and a method for producing a piston, particularly such piston.

The present invention also provides a method for producing a piston. Further embodiments are described in the claims.

The present invention provides a piston with a sealing lip that is uniformly developed in the circumferential direction. In other words, this means that the sealing lip is formed uniform or constant in the circumferential direction, i.e. independent of the angle circumference, or that it is axissymmetrical to the longitudinal axis of the piston or that it has a defined or specified profile in the longitudinal section. This can be achieved, for example, in that the sealing lip of the known pistons is finished in a suitable manner to obtain the desired form. Compared with known pistons, the proposed piston has an improved sealing function.

The piston body can be developed in one piece, if required, or can comprise at least two parts. If required, it can also have at least one groove on its circumferential surface, which can run at least partially in the circumferential direction and/or in the axial direction and/or oblique hereto, and/or have at least one other recess and/or at least one web which run at least partially in the circumferential direction and/or in the axial direction and/or oblique hereto, and/or at least have one other high spot.

The sealing lip may protrude radially outward from the outer circumferential surface. As a result, this ensures contact between the sealing lip and the inner wall of the cylinder of the piston-cylinder arrangement without gaps to the extent possible. In addition, this will also compensate for any potentially present "back memory" of the sealing collar, which is also referred to as "memory effect."

The sealing collar may be widened on its first end. This means that the inner circumferential surface of the sealing collar has a larger diameter in this area. A memory effect which may be present can also be compensated hereby.

The form of the sealing lip can be selected as necessary. For example, the longitudinal section of the first sealing lip may have a profile that has an acute, a right, or an obtuse angle between the adjacent peripheral area of the first peripheral surface and the adjacent peripheral area of the outer circumferential surface. But instead of this angular profile, the first sealing lip can also have a round or still another profile.

The alignment of the first sealing lip relative to the piston body and/or the cylinder can also be selected as necessary. For example, the first peripheral surface may constitute an acute, a right, or an obtuse angle in the longitudinal section to the longitudinal axis of the piston. The first peripheral surface can likewise have any shape as desired and can, for example, be curved concavely or convexly in its longitudinal section or still have another form.

The length of the sealing collar and its position relative to the piston body can be selected as necessary. For example, the piston body has a first face, which is located at the first end of the sealing collar, and the sealing collar on the first end may project beyond the first face in an axial direction. The same can also be applicable for an opposite, second face of the piston body, and an opposite second end of the sealing collar, if required. But it can also be provided, for example, that the piston body projects from the first end of the sealing collar in an axial direction. The same can also be applicable for the second end of the sealing collar, if necessary. Furthermore, the sealing collar on its first end and/or its second end may be shorter than, longer than, or as long as the piston body in the axial direction.

The sealing collar can have a further sealing lip, in addition to the first sealing lip, if required. It can thus actually be provided that the sealing collar has a second peripheral surface and a second sealing lip, that the second peripheral surface connects the two circumferential surfaces with each other on a second end of the sealing collar, and that the second sealing lip is delimited by the second peripheral surface and the outer circumferential surface. For this purpose, the first and the second sealing lip can be developed identically or differently. The foregoing features which were described in connection with the first peripheral surface, the first sealing lip, the second end of the sealing collar and the second face of the piston body, can be applicable individually or in any combination analogously for the second peripheral surface, the second sealing lip, the second end of the sealing collar and the second face of the piston body, if required. The material for this sealing collar can be selected as required. The sealing collar can therefore consist of a thermoplastic material, for example, preferably of a fluorohydrocarbon, or further preferably of PTFE.

The piston body can be produced in any manner, as required. For example, it can be produced powder-metallurgically, for example, preferably by sintering.

The invention also provides a method for producing a piston such that the sealing blank is cut off on its first end, and that the sealing lip with the desired profile is formed on the first end. For this purpose, cutting the sealing blank off on its first end and forming the sealing lip with the desired profile on the first end can be performed in this sequence if required, or at the same time. If the first sealing lip with the desired profile has already been developed through the cutting off of the sealing blank on its first end, then the forming of the sealing lip with the desired profile on the first end has already been performed.

The sealing blank can be formed in any manner, as required, and can be in the form of a circular washer, a sleeve, or a cup, for example.

The cutting off of the sealing blank on its first end can be done in any manner, as required, for example mechanically and/or with the help of a laser.

The sealing blank may be widened on the first end. For this purpose, widening the sealing blank on the first end can be performed either after or prior to cutting the sealing blank on the first end, and/or forming the sealing lip with the desired profile on the first end and widening the sealing blank on the first end can be performed in this sequence, or simultaneously.

In a first alternative, at least one further sealing lip can be produced in addition to the first sealing lip, if required. For example, the sealing blank may be cut off on a second end, and a second sealing lip with the desired profile may be formed on the second end. The foregoing features, which were previously described in connection with the steps of cutting the sealing blank on the first end and forming the sealing lip with the desired profile on the first end and the first end of the sealing blank, can analogously also be applicable for the steps of cutting the sealing blank on the second end and forming the second sealing lip with the desired profile on the second end and the second end of the sealing blank. The steps of cutting the sealing blank on the second end, and/or forming the second end of the sealing lip can be performed after, simultaneously, or prior to the steps of cutting the sealing blank on the first end, and/or forming the first end of the sealing lip and/or widening the first end of the sealing lip, as necessary.

In a second alternative, the sealing blank on a second end is at least partially pressed into an annular groove, which is developed in the circumferential surface of the piston body. This step can be performed after, simultaneously, or prior to the steps of pressing the sealing blank onto the piston body, and/or cutting the first end of the sealing lip, and/or forming the desired profile on the first end of the sealing lip, and/or widening the first end of the sealing lip, as necessary.

Further advantageous embodiments are explained in greater detail, by reference to the following drawings. The individual features shown in the drawings, however, are not restricted to the individual embodiments, but they can be rather combined with individual features that are described earlier in this document or with individual features of other embodiments for further embodiments.

DETAILED DESCRIPTION OF THE INVENTION

Figure 1:
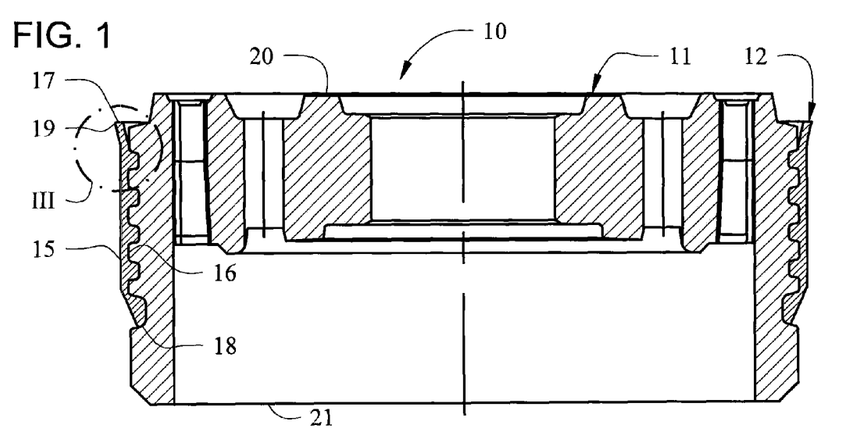
FIG. 1: is a longitudinal section of a first embodiment of a shock absorber piston.
Figure 2:
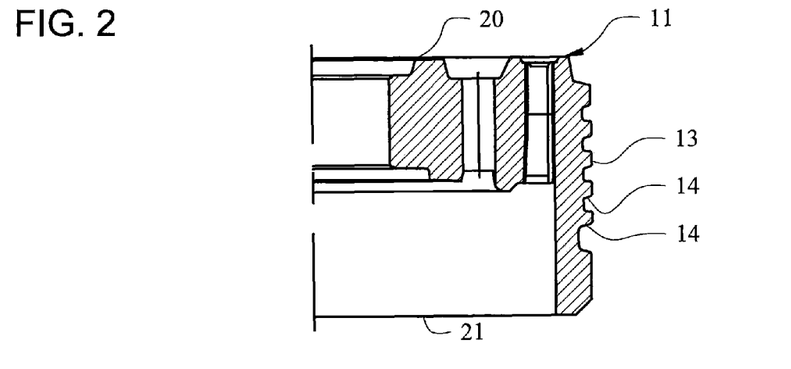
FIG. 2: is a longitudinal section of the piston body of the shock absorber piston of FIG. 1.
Figure 3:
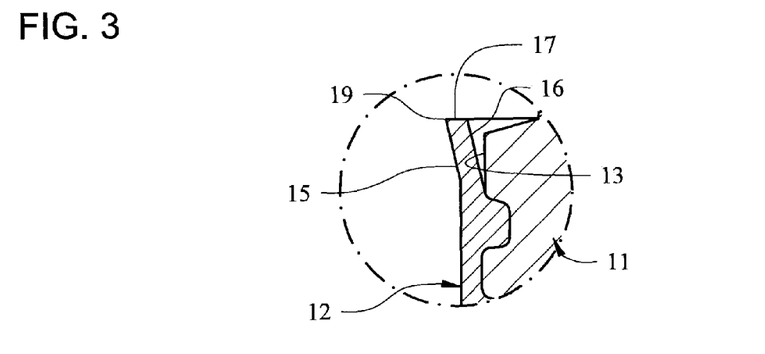
FIG. 3: is section III of FIG. 1 in a larger scale.

FIG. 1 represents a piston 10 in a first embodiment and is developed as a shock absorber piston. It has a piston body 11 and a sealing collar 12. The piston body 11 has a circumferential surface 13, in which five annular grooves 14 are developed, as can be easily seen in FIG. 2. The sealing collar 12 has an outer circumferential surface 15, an inner circumferential surface 16, a first peripheral surface 17, which is located at the top in FIG. 1, a second peripheral surface 18, which is at the bottom in FIG. 1, and a first sealing lip 19, which is shown enlarged in FIG. 3. The sealing collar 12 extends around the circumferential surface 13 and in the axial direction covers an upper part of this circumferential surface 13. In FIGS. 1 and 3, the first peripheral surface 17 connects the outer and inner circumferential surface 15, 16 with each other on the first upper end of the sealing collar 12 and delimits together with the outer circumferential surface 15 the first sealing lip 19. In FIG. 1, the second peripheral surface 18 connects the outer and inner circumferential surface 15, 16 with each other on the second lower end of the sealing collar 12. The sealing collar 12 is facing radially inward on its second end, so that the second peripheral surface is located in the lowest of the five annular grooves 14. The inner circumferential surface 16 bears, in the sections between each two annular grooves 14, closely against the circumferential surface 13 and engages with these in the area of the annular grooves 14.

In this first embodiment of the piston 10, the first sealing lip 19 projects radially outward from the outer circumferential surface 15, as can be clearly seen in FIG. 3. In addition, the sealing collar 12 is widened on the first end, so that it does not bear against the piston body 11 in this area. Furthermore, the first sealing lip 19, in the illustrated longitudinal section, has a profile that forms an acute angle between the adjacent peripheral area of the first peripheral surface 17 and the adjacent peripheral area of the outer circumferential surface 15. In addition, the first peripheral surface 17, in the illustrated longitudinal section, forms a right angle to the longitudinal axis of the piston 10.

In this first embodiment, the piston body 11 has a first and a second face 20, 21, which are located at the first and second end of the sealing collar 12 respectively, and the piston body 11 projects from the first and the second end of the sealing collar 12 in an axial direction. The sealing collar 12 is thus shorter than the piston body 11. In addition, the sealing collar 12 consists of PTFE, which is a thermoplastic material, and the piston body 11 is produced by sintering.

Figure 4:
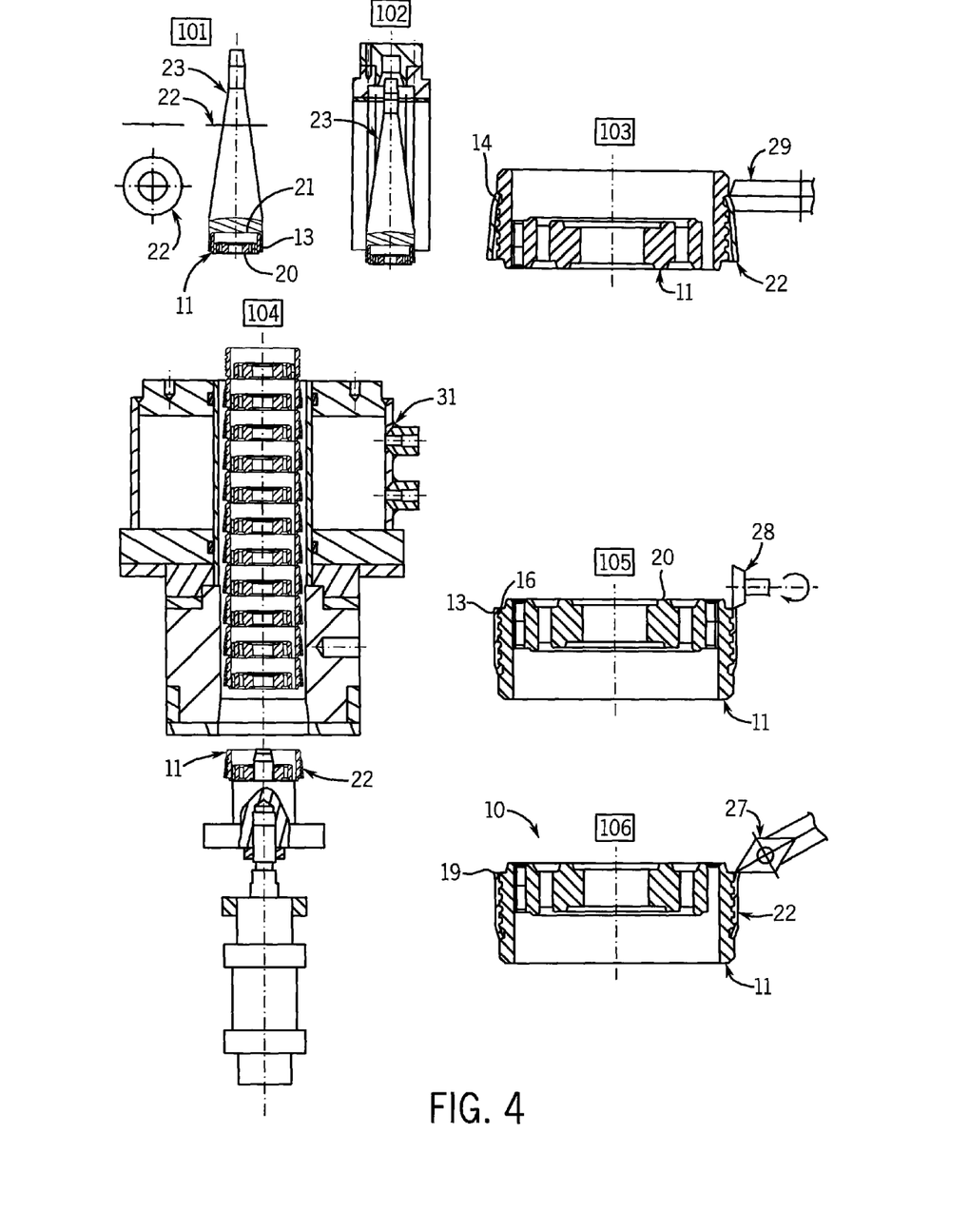
FIG. 4: is a general diagram of a method in a first embodiment for producing the piston of FIG. 1.
Figure 5:
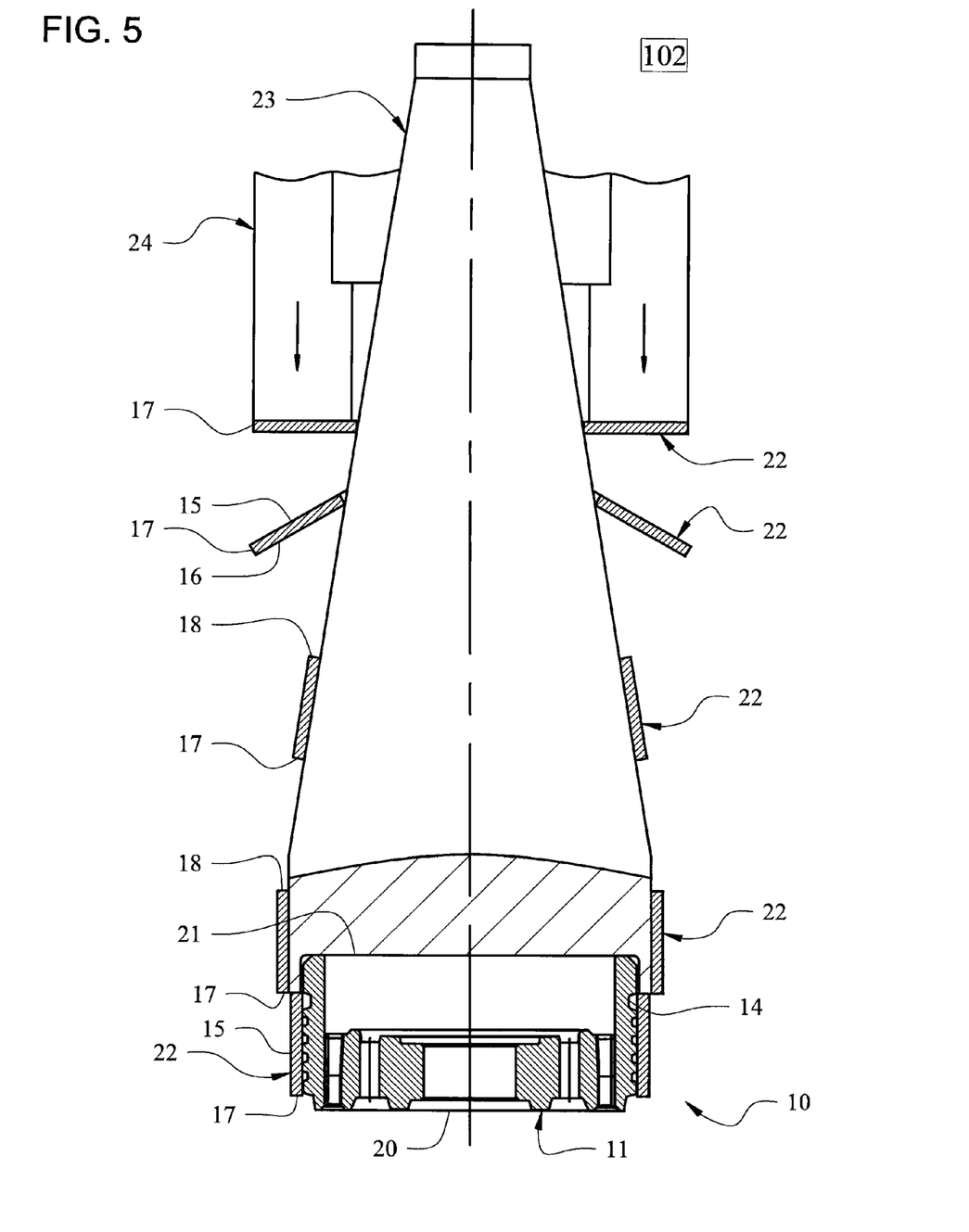
FIG. 5: is a schematic representation of the second step of the method of FIG. 4.

FIGS. 4 and 5 illustrate a method in a first embodiment for producing the piston 10 in FIG. 1.

In a first step 101, a supplied sealing blank 22, which in this first embodiment of the method is a circular washer of PTFE, is pushed from above onto the small end of a mounting cone 23. In addition, the mounting cone 23 is placed onto a supplied piston body 11 such that the first face 20 of the piston body 11 faces down and the wide end of the mounting cone 23 contacts the second face 21 of the piston body 11.

In a second step 102, which is shown in greater detail and enlarged in FIG. 5, a plastic expanding shaft 24 is placed, from above, over the small end of the mounting cone 23 and pushed down in direction of the piston axis, so that the circular washer shaped sealing blank 22 is widened on the one hand and on the other hand is moved towards the mounting cone 23 until it fits into the desired position around the circumferential surface 13 of the piston body 11.

FIG. 5 represents the individual phases of this second step 102 in their chronological sequence from the top to the bottom, so that the piston 10 is shown to be totally at the bottom after this phase is completed. In the second step 102, the sealing blank 22 is initially pushed with its opening onto the small end of the mounting cone 23, which is at the top in FIG. 5, and is then continuously pushed over the mounting cone 23 toward its wide end, thus to the bottom in FIG. 5. At the same time, the outer edge of the sealing blank 22 tilts increasingly down, until the lower face of the initially circular washer shaped sealing blank 22, which in FIG. 5 is at the bottom, fits closely onto the conical cylindrical surface of the mounting cone 23. In FIG. 5, in this condition it can be clearly seen that this lower face as well as the opposite face of the original sealing blank 22 at some stage later will be, respectively, the inner and outer circumferential surface 16, 15 of the finished sealing collar 12. It can also be clearly seen that the outer and the inner peripheral surface, which forms the opening of the original, circular shaped sealing blank 22, will at some later stage be the first and second peripheral surface 17, 18, respectively, of the finished sealing collar 12. When the now funnel-shaped sealing blank 22 has reached the wide end of the mounting cone 23, it will be pushed from the expanding shaft 24 further in FIG. 5 from the top over the second face 21 of the piston body 11, until its first peripheral surface 17 is in the desired position just above the first face 20 and in its second peripheral surface 18 is at the height of the upper edge of the uppermost annular groove 14 in FIG. 5. In this instance, the sealing blank 22 positions itself around piston body 11.

In FIG. 4, in a third step 103, using a roller 29, the second, upper end of the sealing blank 22 is pushed into the uppermost annular groove 14. In this way, the sealing blank 22 is positively affixed to the piston body 11, thereby preventing that the sealing blank 22 in the following step can be shifted further down in FIG. 4 relative to the piston body 11.

In a fourth step 104, the piston body 11 with the affixed sealing blank 22 is pushed from below with its second face 21 in front into a heated and cooled cylindrical circular device 30 to the top. In FIG. 4, in a first, lower, heated area of the circular device 30, the sealing blank 22, while supplied with heat and through axial and radial compression, is precisely calibrated to the desired outside diameter of the finished piston 10 in the area of the outer circumferential surface 15, and in a second, upper, cooled area of the circular device 30, is cooled in a controlled manner by heat dissipation. Since such circular device is known in the prior art, it will not be described in greater detail here.

In a fifth step 105, the piston body 11 with the pressed-on sealing blank 22 is rotated about the piston axis, wherein its first face 20 now faces to the top, and for this purpose, a rotating conical roll 28 is pushed from the top between the circumferential surface 13 of the piston body 11 and the inner circumferential surface 16 of the sealing blank 22, as a result of which the sealing blank 22 is widened on its first end.

In a sixth step 106, the piston body 11 with its widened sealing blank 22 is rotated about the piston axis while a blade 27 is radially pressed from outside onto the first end of the sealing blank 22, as a result of which the sealing blank 22 is cut off on its first end, whereby the cut is directed at a right angle to the longitudinal axis of the piston. This cutting off can be done mechanically, as it is done here, for example, by using the blade 27, and/or by using at least one laser, which is not shown here. Consequently, the first sealing lip 19 was formed with the desired profile which is uniform in the circumferential direction, and the piston 10 is completed in the first embodiment.

Figure 6:
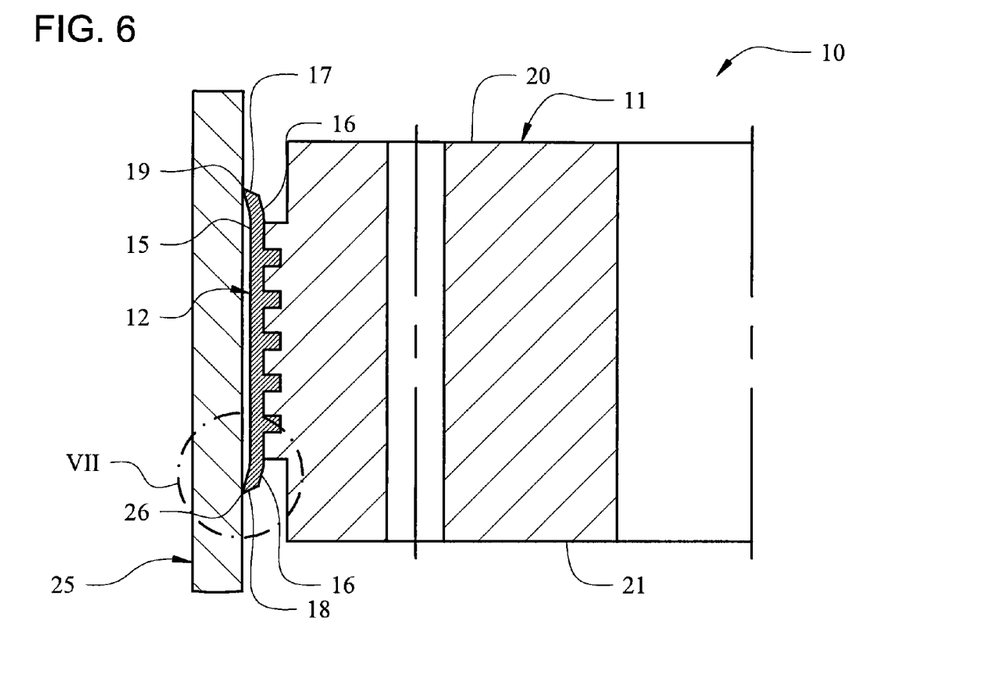
FIG. 6: is a longitudinal section of a piston-cylinder arrangement with a shock absorber piston in a second embodiment.
Figure 7:
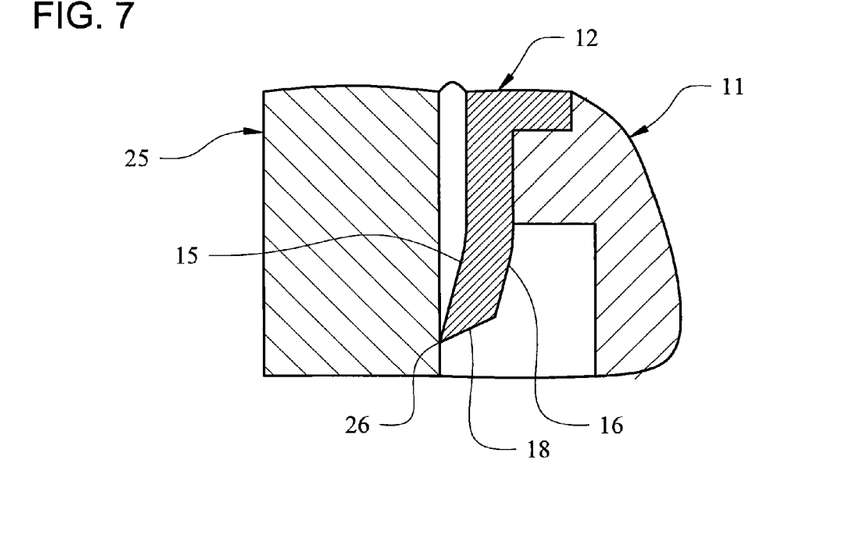
FIG. 7: is the section VII of FIG. 6 in a larger scale.

FIGS. 6 and 7 illustrate a piston-cylinder arrangement, which presents a cylinder 25 and a piston 10 in a second embodiment, which is similar to the first embodiment, so that in the following merely the differences are described in greater detail. In this second embodiment, the piston 10 is executed as a mirror image to the radial middle plane, so that the sealing collar 12 in addition to the first sealing lip 19 has a second sealing lip 26, which is delimited by the second peripheral surface 18 and the outer circumferential surface 15, as can be clearly seen in FIG. 7.

Figure 8:
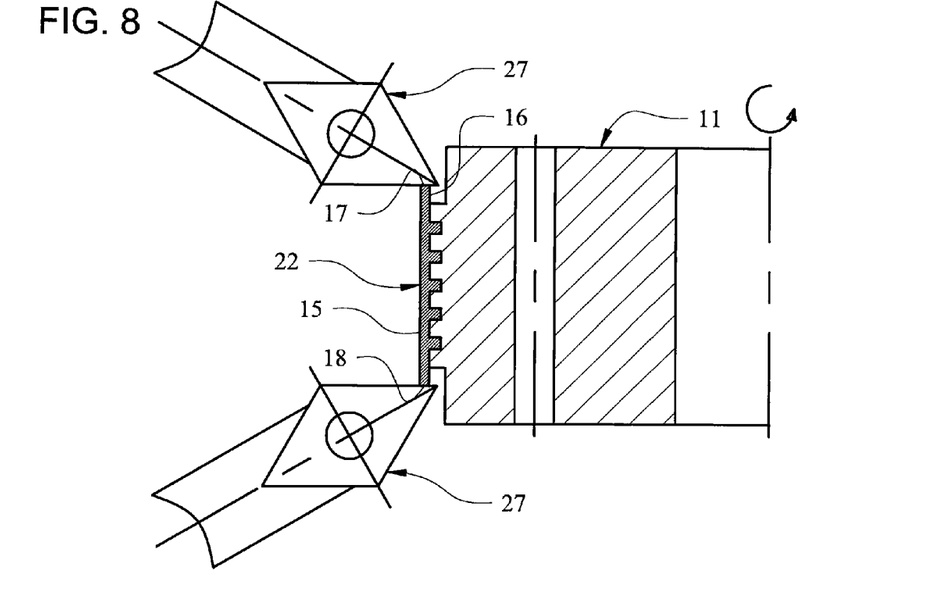
FIG. 8: is a longitudinal section of the piston of FIG. 6 in a process step, in which the sealing blank is cut to size.
Figure 9:
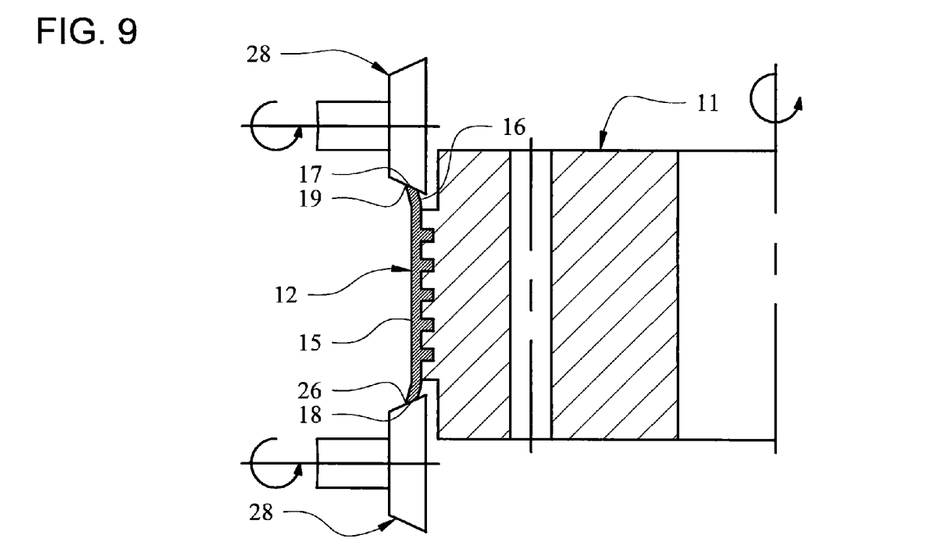
FIG. 9: is a longitudinal section of the piston of FIG. 8 in a process step, in which the cut to size sealing blank is widened and two sealing lips are formed.

The first and the second sealing lip 19, 26 are developed identical here, and respectively project radially to the outside from the outer circumferential surface 15 and in the longitudinal section respectively have a profile that forms an acute angle between the adjacent area of the first and the second peripheral surface 17, 18 and the adjacent peripheral area of the outer circumferential surface 15. Both the first, as well as a second peripheral surface 17, 18, form an acute angle in the longitudinal section to the longitudinal axis of the piston 10. FIGS. 8 and 9 illustrate two steps of a method in a second embodiment for producing the piston 10 illustrated in FIG. 6, which is similar to the first embodiment of the method, so that merely the differences are described in greater detail in the following. With this second embodiment, the second step of the first embodiment is omitted, in that the second end of the sealing blank 22 was pressed inward radially, because here on this second end, the second sealing lip 26 is to be formed. With this second embodiment, after the third step of the calibration, in a fourth step, which is illustrated in FIG. 8, the sealing blank 22 is cut off on both of its ends, which is done mechanically here with the help of two blades 27, each of which perform a cut at a right angle to the longitudinal axis of the piston. The cutting off is done by mechanical rotation here, i.e. the two blades 27 are pressed radially inward against the piston body 11, while this is rotated about the piston axis with the pressed on sealing blank 22.

In a fifth step, which is illustrated in FIG. 9, on the one hand, the first and the second sealing lip 19, 26 are formed with the desired profile on the two cut off ends of the sealing blank 22, and on the other hand, the sealing blank 22 is widened on both of its ends. In this instance, this is performed by mechanical rotation with the help of two conical rolls 28, each of which are rotated about an axis which cuts the piston axis at a right angle, and which has a tapering conical cylindrical surface which extends radially away from the piston axis, thus to the left in FIG. 9, and are respectively pressed from above and below against the cut off first and second end, respectively, of the sealing blank 22, while the piston body 11 with the pressed on sealing blank 22 is rotated about the piston axis. Consequently, the two sealing lips 19, 26 were formed on the two ends of the sealing blank 22 and the piston 10 was finished in the second embodiment.

Figure 10:
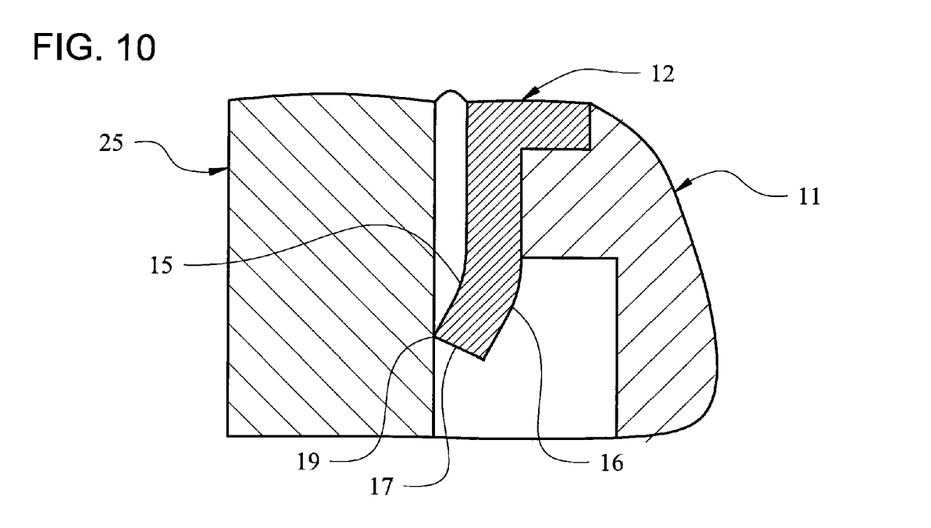
FIG. 10: is an enlarged longitudinal section of a sealing lip with another profile.

FIG. 10 illustrates a first sealing lip 19 with another longitudinal profile, in which the first peripheral surface 17 extends oblique radially inward and axially down and forms a right angle with the adjacent peripheral area of the outer circumferential surface 15 as well as an obtuse angle to the piston axis.

The invention claimed is:

1. A method for producing a piston for a shock absorber piston-cylinder, comprising the steps of:
   a) providing a sealing blank and a piston body, the piston body having a circumferential surface;
   b) pushing the sealing blank over the piston body;
   c) pressing the sealing blank onto the piston body;
   d) cutting off the sealing blank on a first end;
   e) forming a first sealing lip with a first desired profile on the first end; and
   f) widening the sealing blank on the first end, such that the first end does not bear against the piston body,
      wherein the sealing blank forms a sealing collar for the piston body, the sealing collar having an outer circumferential surface, an inner circumferential surface, a first peripheral surface and the first sealing lip, the sealing collar extending around the circumferential surface of the piston body covering at least a part of the circumferential surface of the piston body in an axial direction, the first peripheral surface connecting the outer circumferential surface and the inner circumferential surface with each other on the first end, and the first sealing lip being delimited by the first peripheral surface and the outer circumferential surface and being configured evenly in the circumferential direction.

2. The method according to claim 1, wherein the sealing collar has a second peripheral surface and a second sealing lip, the second peripheral surface connects the outer circumferential surface and the inner circumferential surface with each other on a second end of the sealing collar, and the second sealing lip is delimited by the second peripheral surface and the outer circumferential surface.

3. The method according to claim 2, wherein the first and the second sealing lip are configured identically or differently.

4. The method according to claim 1, wherein the steps d) and e) are performed in this sequence or simultaneously.

5. The method according to claim 1, wherein the sealing blank has the form of a circular washer, a sleeve, or a cup.

6. The method according to claim 1, wherein the cutting off in step d) is performed mechanically and/or with the help of a laser.

7. The method according to claim 1, wherein the step f) is performed before or after the step d).

8. The method according to claim 1, wherein the steps e) and f) are performed in this sequence or simultaneously.

9. The method according to claim 1, further comprising the steps of:
   cutting the sealing blank off on a second end; and
   forming a second sealing lip with a second desired profile on the second end.

10. The method according to claim 1, further comprising the step of:
    pressing the sealing blank on a second end at least partially into an annular groove which is developed in the circumferential surface of the piston body.

11. The method according to claim 1, wherein the first sealing lip projects radially out from the outer circumferential surface.

12. The method according to claim 1, wherein the first sealing lip has a profile in a longitudinal section that has an acute, a right, or an obtuse angle between an adjacent peripheral area of the first peripheral surface and an adjacent peripheral area of the outer circumferential surface.

13. The method according to claim 1, wherein the first peripheral surface in a longitudinal section forms an acute, a right, or an obtuse angle to a longitudinal axis of the piston.

14. The method according to claim 1, wherein the piston body has a first face which is positioned at a first end of the sealing collar, and the sealing collar projects beyond the first face on the first end of the sealing collar in the axial direction.

15. The method according to claim 1, wherein the piston body projects in the axial direction from a first end of the sealing collar.

16. The method according to claim 1, wherein the sealing collar, on a first end of the sealing collar in the axial direction, is shorter than, longer than, or as long as the piston body.

17. The method according to claim 1, wherein the sealing collar comprises a material selected from the group consisting of a fluorohydrocarbon, PTFE and any other thermoplastic material.

18. The method according to claim 1, wherein the piston body is manufactured powder-metallurgically.

19. The method according to claim 1, wherein the first sealing lip is adapted to form a sliding seal against an interior surface of a cylinder.

* * * * *